(12) United States Patent
Chaussade

(10) Patent No.: US 8,030,371 B2
(45) Date of Patent: Oct. 4, 2011

(54) ORGANOPOLYSILOXANE COMPOSITIONS THAT HARDEN INTO ELASTOMERS AT AMBIENT TEMPERATURE IN THE PRESENCE OF MOISTURE

(75) Inventor: Marc Chaussade, Villeurbanne (FR)

(73) Assignee: Rhodia Chimie, Aubervilliers (FR)

( * ) Notice: Subject to any disclaimer, the term of this patent is extended or adjusted under 35 U.S.C. 154(b) by 173 days.

(21) Appl. No.: 11/817,627

(22) PCT Filed: Feb. 22, 2006

(86) PCT No.: PCT/FR2006/000398
§ 371 (c)(1),
(2), (4) Date: Nov. 13, 2007

(87) PCT Pub. No.: WO2006/095069
PCT Pub. Date: Sep. 14, 2006

(65) Prior Publication Data
US 2009/0131553 A1    May 21, 2009

(30) Foreign Application Priority Data
Mar. 4, 2005    (FR) .................................... 05 02179

(51) Int. Cl.
*C08L 83/04*    (2006.01)

(52) U.S. Cl. ......... 523/122; 524/425; 524/500; 524/588
(58) Field of Classification Search .................. 523/122; 524/425, 500, 588
See application file for complete search history.

(56) References Cited

U.S. PATENT DOCUMENTS

| 4,528,324 | A | * | 7/1985 | Chung et al. ................... 524/863 |
| 5,079,324 | A | * | 1/1992 | Cocco et al. ..................... 528/14 |
| 5,674,936 | A | | 10/1997 | Lucas |
| 5,698,653 | A | | 12/1997 | Lucas et al. |
| 5,741,839 | A | | 4/1998 | Scheim |
| 6,303,678 | B1 | | 10/2001 | Ziche |

OTHER PUBLICATIONS

"International Search Report," International Patent Application No. PCT/FR06/00398 (Jul. 6, 2006).
International Search Report dated Jul. 6, 2007.

* cited by examiner

*Primary Examiner* — Ling Choi
*Assistant Examiner* — Chun-Cheng Wang
(74) *Attorney, Agent, or Firm* — Baker, Donelson, Bearman, Caldwell & Berkowitz, PC

(57) ABSTRACT

This invention is directed to single-component alkoxy silicon sealants and methods of making the sealants. The sealants are made from a masterbatch M that includes at least one organopolysiloxane A having terminal and/or pendant alkoxylated groups and at least one mineral filler B.

7 Claims, No Drawings

ORGANOPOLYSILOXANE COMPOSITIONS THAT HARDEN INTO ELASTOMERS AT AMBIENT TEMPERATURE IN THE PRESENCE OF MOISTURE

CROSS REFERENCE TO RELATED APPLICATIONS

The present application is a 35 U.S.C. §371 National Stage Application of International Application No. PCT/FR2006/000398, having an international filing date of Feb. 22, 2006, and claiming priority to FR 0502179 filed Mar. 4, 2005, the entire contents of which are hereby incorporated by reference.

BACKGROUND OF THE INVENTION

1. Field of the Invention

The field of the invention is that of single-component silicone sealants that are stable during storage in the absence of moisture and that crosslink, by polycondensation reactions catalyzed using a catalyst, into elastomers that adhere to various supports, while being accompanied by a release of alcohol and being carried out at ambient temperature (for example, 5 to 35° C.) and in the presence of water (for example, ambient moisture). These sealants are commonly known as "single-component alkoxy silicone sealants".

2. Description of Related Art

Such sealants based on silicone elastomers are used in many applications, especially in the building industry, as a means of leakproofing, jointing, coating and/or assembling, among others. The rheological properties of these single-component silicone sealants (pasty form) are the subject of much attention in these applications. It is the same as regards their resistance to bad weather and to heat, their low-temperature flexibility, their ease of use and their rapid in situ crosslinking/curing in contact with moisture from the air.

It is known how to prepare compositions having these properties by mainly mixing diorganopolysiloxane polymer(s) having terminal alkoxyl groups, mineral filler(s), silanes substituted by particular hydrolyzable groups, adhesion promoter(s) and a curing (or crosslinking) catalyst.

The abovementioned polycondensation reactions are those where Si—OR bonds react together (the R substituent being an alkyl residue) in the presence of water while releasing an alcohol ROH.

Compositions of this type appear more particularly in U.S. Pat. No. 5,674,936 and U.S. Pat. No. 5,698,653. The compositions according to this prior art are formed by mixing a diorganopolysiloxane polymer having terminal alkoxyl groups, a siliceous mineral filler, a nonreactive diorganopolysiloxane polymer having terminal trialkylsiloxyl groups, a curing catalyst based on a tetraalkyl titanate and an adhesion promoter consisting of a tris[1,3,5-(trialkoxysilyl)alkyl]isocyanurate (in the case of U.S. Pat. No. 5,674,936) or of an epoxysilane (in the case of U.S. Pat. No. 5,698,653).

However, a difficulty with which a person skilled in the art finds himself confronted with is the stability during storage, in particular in cartridges, of an alkoxy type sealant before its use. The stability is further degraded when the temperature of the storage medium is high. This is also expressed, when they are used after a long storage (of 3 to 12 months), by a degradation of the application properties of the sealant. Among the important properties required for good application of the single-component alkoxy silicone sealant, mention may be made of the extrudability, the cure rate (crosslinking over at least 2 mm in 24 hours) and the mechanical strength properties such as the tensile strength and the modulus at 100% elongation. It is understood that these problems of storage stability in cartridges also cause major difficulties as regards the logistics required for the delivery of this type of product, especially in hot countries.

To overcome the problems of storage stability, U.S. Pat. No. 5,741,839 proposes adding, to the sealant, a stabilizer which is a carbodiimide while proving that a sealant prepared without this additive can no longer be crosslinked after storage for 24 hours at 100° C.

SUMMARY OF THE INVENTION

Considering this technological background, one of the main objects of the present invention is to obtain a single-component alkoxy silicone sealant having good applicability throughout its lifecycle, from manufacture to use, this being so even after a long storage away from air moisture before use (storage of 3 to 12 months).

Another object of the invention is to obtain a single-component alkoxy silicone sealant having a good extrudability, a rapid cure rate (crosslinking over at least 2 mm in 24 hours) and good mechanical strength properties such as tensile strength and modulus at 100% elongation, this being so even after a long storage away from air moisture before use (storage of 3 to 12 months).

Another object of the invention is to maintain the other properties while maintaining, during its use, its usage properties of the elastomer obtained after crosslinking of the single-component alkoxy silicone sealant in the presence of moisture.

These objects, among others, are achieved by the present invention which firstly relates to the use of a masterbatch M to obtain a single-component alkoxy silicone sealant having good extrudability, a rapid cure rate (crosslinking over at least 2 mm in 24 hours) and good mechanical strength properties after crosslinking of the single-component alkoxy silicone sealant, this being so even after a long storage (storage of 3 to 12 months before use) of said single-component alkoxy silicone sealant away from air moisture, in particular in cartridges, characterized in that said masterbatch M and said single-component alkoxy silicone sealant are prepared according to the following steps:

a) the preparation, in a stirred reactor, of the masterbatch M that is stable during storage and transportable and that does not contain a curing catalyst G according to the steps a-1) and a-2) below:

a-1) preparation of a silicone composition comprising:
    at least one organopolysiloxane A having terminal and/or pendent alkoxylated groups;
    at least one mineral filler B preferably based on amorphous silica, in particular based on amorphous pyrogenic silica, optionally at least one other filler such as crystalline silica, calcium carbonate or a filler having a lamellar structure such as mica;
    optionally at least one silane crosslinker C1 having alkoxylated functional groups;
    optionally at least one nonreactive linear diorganopolysiloxane D of formula (I):

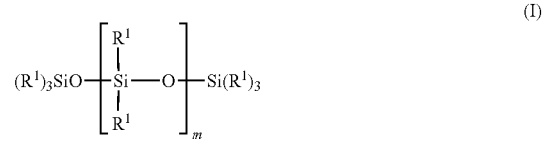

in which:
    the $R^1$ substituents, which are identical or different, each represent an aliphatic, cyclanic or aromatic, substituted or unsubstituted, saturated or unsaturated, $C_1$ to $C_{13}$ monovalent hydrocarbon-based radical; and m has a sufficient value to give the polymer of formula (I) a dynamic viscosity at 25° C. ranging from 10 to 200 000 mPa·s; and optionally at least one auxiliary agent F known to a person skilled in the art which is generally chosen, when it is needed, depending on the applications in which the compositions according to the present invention are used; said auxiliary agent F preferably being chosen from the group composed of adhesion promoters F1, antifungal agents F2, bactericides F3, inert organic diluents F4, plasticizers F5, thixotroping agents F6 and stabilizers F7; and a-2) said silicone composition resulting from step a-1) continues to be stirred and is subjected to a devolatilization operation in order to obtain said masterbatch M;

b) the preparation of the single-component alkoxy silicone sealant:

added to said stirred masterbatch M, optionally after storage of said masterbatch M, are:

an effective amount of a curing catalyst G alone or in the form of a preparation comprising said curing catalyst G;

optionally at least one auxiliary agent F known to a person skilled in the art which is generally chosen, when it is needed, depending on the applications in which the compositions according to the present invention are used; said auxiliary agent F preferably being chosen from the group composed of adhesion promoters F1, antifungal agents F2, bactericides F3, inert organic diluents F4, plasticizers F5, thixotroping agents F6 and stabilizers F7;

optionally a supplement of said mineral filler B; and optionally at least one colored pigment H alone or in the form of a preparation comprising said colored pigment H; and optionally a finishing step is carried out during which the single-component alkoxy silicone sealant continues to be stirred and is subjected to a devolatilization operation preferably carried out under a pressure below atmospheric pressure.

To achieve this objective, the Applicant has the merit of demonstrating, quite surprisingly and unexpectedly, that during the preparation of a single-component alkoxy silicone sealant, the preparation of a masterbatch M according to the invention in a separate step, comprising a devolatilization operation, and prior to the step of adding a curing catalyst, makes it possible to obtain a single-component alkoxy silicone sealant, the ability of which to be stored, for example in cartridges, is improved and this being without adding a stabilizer such as for example a carbodiimide or titanium complexes.

In addition, the single-component alkoxy silicone sealant thus obtained is economical and results in crosslinked elastomers having advantageous mechanical properties and that adhere to numerous supports.

Another advantage linked to the prior preparation of a masterbatch M that is stable during storage and is transportable according to the invention appears during the process of manufacturing a single-component alkoxy silicone sealant. This is because the stability of the masterbatch M is significantly improved due to the absence of a curing catalyst. This masterbatch M is a dispersion of silicone oil(s) that is stable during storage and is transportable comprising fillers including amorphous pyrogenic silica and some of the constituents required for manufacturing a single-component alkoxy silicone sealant. This masterbatch, which is easily transportable due to being stable during storage, may be used on another production site, thus allowing a flexibility in the process for manufacturing a single-component alkoxy silicone sealant.

The amorphous pyrogenic silicas are important components of single-component alkoxy silicone sealants in the same way as polyorganosiloxane oils. Pyrogenic silicas, like polyorganosiloxane oils, are manufactured from common raw materials (chlorosilanes). These chlorosilanes are difficult to transport. It is therefore advantageous to produce the polyorganosiloxane oils and the pyrogenic silicas on nearby industrial sites.

Furthermore, the introduction of fillers in the preparation of a single-component alkoxy silicone sealant is essential and has the purpose of conferring good mechanical and rheological characteristics to the elastomers after curing. It is known that the handling of these fillers, for example silica, on a production site is extremely delicate. Silica is a powder having a low bulk density (of around 30 to 50 g/l) which causes an additional complexity during its introduction into a silicone composition. This delicate step may, owing to the stability of the novel masterbatch according to the invention, be carried out on a site for producing fillers, such as silica, and thus avoid the delicate transport of fillers having low bulk density to a site for producing a single-component alkoxy silicone sealant.

This novel possibility offered by the invention makes it possible to envision production units dedicated to the manufacture of the masterbatch M close to the manufacturers of fillers such as silica, and units for producing single-component alkoxy silicone sealants close to the end user. In the conventional process, this is difficult as all the steps of the process, manufacture up to packaging of the single-component alkoxy silicone sealant, are carried out on a single production site.

Another subject of the invention relates to a method of preparing a single-component alkoxy silicone sealant having good extrudability, a rapid cure rate (crosslinking over at least 2 mm in 24 hours) and good mechanical strength properties after crosslinking of the single-component alkoxy silicone sealant, this being so even after a long storage (storage of 3 to 12 months before use) of said single-component alkoxy silicone sealant away from air moisture, in particular in cartridges, characterized in that said single-component alkoxy silicone sealant is prepared according to the following steps:

a) the preparation, in a stirred reactor, of a masterbatch M that is stable during storage and transportable and that does not contain a curing catalyst G according to the steps a-1) and a-2) below:

a-1) preparation of a silicone composition comprising:

at least one organopolysiloxane A having terminal and/or pendent alkoxylated groups;

at least one mineral filler B preferably based on amorphous silica, in particular based on amorphous pyrogenic silica, optionally at least one other filler such as crystalline silica, calcium carbonate or a filler having a lamellar structure such as mica;

optionally at least one silane crosslinker C1 having alkoxylated functional groups;

optionally at least one nonreactive linear diorganopolysiloxane D of formula (I):

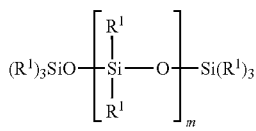

in which:
  the $R^1$ substituents, which are identical or different, each represent an aliphatic, cyclanic or aromatic, substituted or unsubstituted, saturated or unsaturated, $C_1$ to $C_{13}$ monovalent hydrocarbon-based radical; and
  m has a sufficient value to give the polymer of formula (I) a dynamic viscosity at 25° C. ranging from 10 to 200 000 mPa·s; and
optionally at least one auxiliary agent F known to a person skilled in the art which is generally chosen, when it is needed, depending on the applications in which the compositions according to the present invention are used; said auxiliary agent F preferably being chosen from the group composed of adhesion promoters F1, antifungal agents F2, bactericides F3, inert organic diluents F4, plasticizers F5, thixotroping agents F6 and stabilizers F7; and a-2) said silicone composition resulting from step a-1) continues to be stirred and is subjected to a devolatilization operation in order to obtain said masterbatch M;

b) the addition to said masterbatch M, of, with stirring, optionally after storage of said masterbatch M:
  an effective amount of a curing catalyst G alone or in the form of a preparation comprising said curing catalyst G;
  optionally at least one auxiliary agent F known to a person skilled in the art which is generally chosen, when it is needed, depending on the applications in which the compositions according to the present invention are used; said auxiliary agent F preferably being chosen from the group composed of adhesion promoters FP, antifungal agents F2, bactericides F3, inert organic diluents F4, plasticizers F5, thixotroping agents F6 and stabilizers F7;
  optionally a supplement of said mineral filler B; and
  optionally at least one colored pigment H alone or in the form of a preparation comprising said colored pigment H; and c) optionally a finishing step during which the mixture obtained at the end of the preceding step continues to be stirred and is subjected to a devolatilization operation preferably carried out under a pressure below atmospheric pressure.

DETAILED DESCRIPTION OF A PREFERRED EMBODIMENT

According to one preferential mode, when said masterbatch M is transported, this transport is carried out by means of flexible containers that contain a drainage device comprising at least one pressure member such as a piston, a set of rollers and/or a pressure fluid. These flexible ("big bag") containers are, for example, bags made of fabric (e.g. polypropylene) lined with a thin, for example multilayered (polyethylene/aluminum/polyethylene terephthalate) bag bonded and/or stitched to the fabric, which contain a drainage device comprising at least one pressure member which may be a piston, a set of rollers or a pressure fluid. These bags are described in Patent Application WO-A-2004/07464. This type of self-contained packaging may be transported easily, for example by simply being placed on a pallet and tied down, or else included in other containers that are not involved in the drainage process, unlike the thin polyethylene bags which, in a known manner, are housed in rigid containers that are used both for transport and drainage. These flexible or "big bag" containers may have large capacities, for example between 500 and 2000 liters.

Regarding the organopolysiloxane A having terminal and/or pendent alkoxylated groups, it is prepared according to techniques known to a person skilled in the art, see for example U.S. Pat. Nos. 3,175,993, 4,772,675, 4,871,827, 4,888,380, 4,898,910 and 4,906,719 which teach the preparation of polyorganosiloxanes terminated by alkoxysilylethylene functional groups.

According to one preferred embodiment of the invention, in step a) the organopolysiloxane A having terminal and/or pendent alkoxylated groups is obtained in situ by functionalization:
  of at least one reactive organopolysiloxane I comprising at least two hydroxyl groups;
  in the presence of a catalytically effective amount of a functionalization catalyst J; and
  of at least one silane crosslinker C2 having alkoxylated functional groups.

According to another preferred embodiment, the organopolysiloxane A having terminal and/or pendent alkoxylated groups is prepared in situ by functionalization:
  of at least one reactive polyorganosiloxane I comprising at least two hydroxyl groups composed of siloxyl units of formula (II);

in which formula:
  z=0 or 1;
  x and y=0, 1, 2 or 3;
  x+y+z≦3;
  the $R^3$ and $R'^3$ substituents, which are identical or different, each represent an aliphatic, cyclanic or aromatic, substituted or unsubstituted, saturated or unsaturated, $C_1$ to $C_{13}$ monovalent hydrocarbon-based radical; and
  the number of units of formula (II) is chosen so as to give to the polyorganosiloxane of formula (II) a dynamic viscosity at 25° C. ranging from 50 to 1 000 000 mPa·s;
  in the presence of a catalytically effective amount of a functionalization catalyst J; and
  of at least one silane crosslinker C2 having alkoxylated functional groups.

It should be understood that, within the scope of the present invention, it is possible to use, as a reactive polyorganosiloxane I comprising at least two hydroxyl groups, a blend made of several hydroxylated polyorganosiloxanes that differ from each other by the value of the viscosity and/or the nature of the substituents linked to the silicon atoms. It should be indicated, in addition, that the hydroxylated polyorganosiloxanes of formula (II) may optionally comprise T units of formula $R^3SiO_{3/2}$ and/or Q units of formula $SiO_{4/2}$.

Linear reactive hydroxylated diorganopolysiloxane polymers I are used having a dynamic viscosity at 25° C. ranging from 50 to 1 000 000 mPa·s and, preferably, ranging from 50 to 200 000 mPa·s.

The R¹, R³ and R'³ substituents mentioned above for the nonreactive linear diorganopolysiloxanes D and the reactive polyorganosiloxanes I comprising at least two hydroxyl groups comprise:
- alkyl and haloalkyl radicals having from 1 to 13 carbon atoms such as methyl, ethyl, propyl, isopropyl, butyl, pentyl, hexyl, 2-ethylhexyl, octyl, decyl, 3,3,3-trifluoropropyl, 4,4,4-trifluorobutyl and 4,4,4,3,3-pentafluorobutyl radicals;
- cycloalkyl and halocycloalkyl radicals having from 5 to 13 carbon atoms such as cyclopentyl, cyclohexyl, methylcyclohexyl, propylcyclohexyl, 2,3-difluorocyclobutyl and 3,4-difluoro-5-methylcycloheptyl radicals;
- alkenyl radicals having from 2 to 8 carbon atoms such as vinyl, allyl or 2-butenyl radicals;
- mononuclear aryl and haloaryl radicals having 6 to 13 carbon atoms such as phenyl, tolyl, xylyl, chlorophenyl, dichlorophenyl or trichlorophenyl radicals; and
- cyanoalkyl radicals of which the alkyl linkages have from 2 to 3 carbon atoms such as β-cyanoethyl and γ-cyanopropyl radicals.

Regarding the nonreactive linear diorganopolysiloxanes D, they have a dynamic viscosity at 25° C. ranging from 10 to 200 000 mPa·s and, preferably, ranging from 50 to 150 000 mPa·s.

According to one more preferred embodiment of the invention, in step a-1) of the method according to the invention, the proportions based on 100 parts by weight of reactive organopolysiloxane I comprising at least two hydroxyl groups are the following:
- from 2 to 25 parts of silane crosslinker(s) C2;
- a catalytically effective amount of functionalization catalyst J;
- from 0 to 50 parts of nonreactive, linear diorganopolysiloxane(s) D;
- from 2 to 150 parts of mineral filler(s) B; and
- from 0 to 50 parts of auxiliary agent(s) F.

When it is envisioned to use several reactive polyorganosiloxanes I, it is advantageous to use one reactive polyorganosiloxane I comprising at least two hydroxyl groups combined with one hydroxylated organopolysiloxane resin E.

The resins that are more particularly chosen are those of the type T(OH), DT(OH), DQ(OH), DT(OH), MQ(OH), MDT(OH), MDQ(OH) or mixtures thereof. In these resins, each OH group is borne by a silicon atom belonging to a D, T or Q unit.

In the terminology of silicone chemistry, the siloxane units M, D, T and Q are defined as follows:

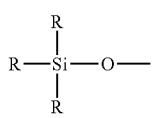  M

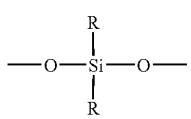  D

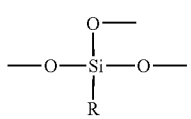  T

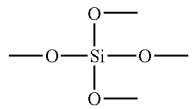  Q

These resins are products of condensation (monocondensation or polycondensation, heterocondensation or homocondensation) of monomers, of oligomers or of POS polymers bearing condensable groups, preferably of hydroxyl nature.

As examples of hydroxylated organopolysiloxane resins E, mention may be made of the hydroxylated organopolysiloxane resins having TD or MDT units, comprising at least 20% by weight of T units and having a weight content of hydroxyl groups ranging from 0.3 to 5%. Even more preferably, resins of this type are used in the structure of which at least 80% by number of R¹ substituents are methyl radicals. The hydroxyl groups of hydroxylated organopolysiloxane resins E may be borne by the M, D and/or T units.

According to one preferred mode, the silane crosslinkers C1 and/or C2, which are identical or different, are polyalkoxysilanes of formula (III):

$$(R^4)_a Si(OR^5)_{4-a} \quad (III)$$

in which formula:
- the R⁴ substituent represents an aliphatic, cyclanic or aromatic, substituted or unsubstituted, saturated or unsaturated, C₁ to C₁₃ monovalent hydrocarbon-based radical;
- the R⁵ symbols, which are identical or different, each represent a linear or branched C₁ to C₈ alkyl radical; and
- a is 0, 1 or 2.

Among the silane crosslinker(s) C1 and C2 that are used within the scope of the present invention, mention may especially be made of those listed below:
Si(OCH₃)₄;
Si(OCH₂CH₃)₄;
Si(OCH₂CH₂CH₃)₄;
(CH₃O)₃SiCH₃;
(C₂H₅O)₃SiCH₃;
(CH₃O)₃Si(CH=CH₂);
(C₂H₅O)₃Si(CH=CH₂)
(CH₃O)₃Si(CH₂—CH=CH₂);
(CH₃O)₃Si[CH₂—(CH₃)C=CH₂];
(C₂H₅O)₃Si(OCH₃); and
C₆H₅Si(OCH₃)₃.

The silane crosslinker(s) C preferably used are: Si(OC₂H₅)₄, CH₃Si(OCH₃)₃, CH₃Si(OC₂H₅)₃, (C₂H₅O)₃Si(OCH₃), (CH₂=CH)Si(OCH₃)₃, (CH₂=CH)Si(OC₂H₅)₃.

The crosslinker(s) C1 and C2 may also be in an oligomeric form comprising 1 to 10 silicon atom(s).

As regards the functionalization catalyst J, in the presence of which the reaction of hydroxylated polymers I with the silane crosslinker(s) C takes place, use may in particular be made of the following compounds:
- lithium hydroxide of formula LiOH or LiOH.H₂O (cf. EP-A-0 367 696);
- sodium hydroxide; and
- potassium hydroxide (cf. EP-A-0 457 693).

Within the scope of the present invention, it is recommended to use, as catalyst J, lithium hydroxide of formula LiOH or LiOH.H₂O which may be used in solution in at least one aliphatic alcohol E having from 1 to 3 carbon atoms, such as for example methanol, ethanol, isopropanol or a mixture of these alcohols.

The expression "catalytically effective amount of functionalization catalyst J" is understood to mean an amount such that the functionalization reaction rate is as high as possible, especially by using $Si(OC_2H_5)_4$, $CH_3Si(OCH_3)_3$, $CH_3Si(OC_2H_5)_3$, $(C_2H_5O)_3Si(OCH_3)$, $(CH_2=CH)Si(OCH_3)_3$, $(CH_2=CH)Si(OC_2H_5)_3$ as a functionalization agent. In most cases, 0.001 to 5 mol of catalyst is used per 1 mol of silanol groups ($\equiv$Si—OH) borne by the hydroxylated reactive polyorganosiloxane(s) I and optionally by the hydroxylated organopolysiloxane resin(s) E. In the preferred case using lithium hydroxide, 0.005 to 0.5 mol of LiOH is used per 1 mol of silanol groups.

The suggested filler B is mineral and may be composed of products chosen from siliceous or nonsiliceous materials.

Regarding siliceous materials, they may act as a reinforcing or semireinforcing filler.

The reinforcing siliceous fillers are chosen from colloidal silicas, pyrogenic (or fumed) silica powders and precipitated silica powders or a mixture thereof.

These powders have an average particle size generally below 1 μm and a BET specific surface area greater than 50 $m^2/g$, preferably between 100 and 350 $m^2/g$.

Semireinforcing siliceous fillers such as amorphous silicas, diatomaceous earths or ground quartz may also be used.

As regards the nonsiliceous mineral materials, they may be involved as a semireinforcing or bulking mineral filler. Examples of these nonsiliceous fillers that can be used alone or as a mixture are carbon black, titanium dioxide, aluminum oxide, hydrated alumina, expanded vermiculite, nonexpanded vermiculite, calcium carbonate, zinc oxide, mica, talc, iron oxide, barium sulfate and slaked lime. These fillers have a particle size generally between 0.001 and 300 μm and a BET surface area of less than 100 $m^2/g$.

In a practical but nonlimiting manner, the filler used is pyrogenic silica powder.

These fillers may be surface-modified by treatment with the various organic or organosilicon compounds normally employed for this use. Thus, these organosilicon compounds may be organochlorosilanes, diorganocyclopolysiloxanes, hexaorganodisiloxanes, hexaorganodisilazanes or diorganocyclopolysilazanes (Patents FR 1 126 884, FR 1 136 885, FR 1 236 505 and GB 1 024 234). The treated fillers include, in most cases, from 3 to 30% of their weight of organosilicon compounds.

The purpose of introducing fillers is to confer good mechanical and rheological properties on the elastomers resulting from the curing of compositions according to the invention. A single species of filler or blends of several species may be introduced.

As examples of curing catalyst G, mention may be made of tin monocarboxylates and dicarboxylates such as tin 2-ethylhexanoate, dibutyltin dilaurate, dibutyltin diacetate (see the book by NOLL "Chemistry and Technology of Silicones", page 337, Academic Press, 1968-$2^{nd}$ edition).

Hexacoordinated chelates of tin having a valency of IV, such as those described in European Patent Application EP-A-147 323 and U.S. Pat. No. 4,517,337, cited as reference, are particularly suitable.

Also preferred are curing catalysts that are a mixture of a diorganotin bis(β-diketonate) with an organic derivative of tin, also having a valency of IV, but free from β-diketonate functional groups, and having at least one tin atom, each tin atom bearing two organic radicals linked by a Sn—C bond, the other two valencies being satisfied by means of radicals chosen from organic or inorganic radicals linked by a SnO or SnS bond, by halogen atoms, by hydroxy groups and by oxygen atoms.

As other examples of curing catalyst G, mention may also be made of the organic derivatives of titanium which are described in the Application FR-A-2 786 497 such as:

ethyl titanate, propyl titanate, isopropyl titanate, butyl titanate, 2-ethylhexyl titanate, octyl titanate, decyl titanate, dodecyl titanate, β-methoxyethyl titanate, β-ethoxyethyl titanate, β-propoxyethyl titanate or the titanate of formula $Ti[(OCH_2CH_2)_2OCH_3]_4$.

The curing catalysts described in Applications FR-A-2 856 694, FR-A-2 856 695 and FR 0 315 286 may also be used.

As auxiliary agent(s) F such as especially, per 100 parts by weight of linear diorganopolysiloxane polymer(s) A, mention may be made of:

optionally from 0.1 to 10 parts of an adhesion promoter F1; and optionally an effective amount of at least one compound taken from the group formed by: antifungal agents F2; bactericides F3; inert organic diluents F4 (such as especially: high-boiling-point oil cuts, toluene, xylene, heptane, white spirit, trichloroethylene or tetrachloroethylene); plasticizers F5, for example belonging to the group of alkylbenzenes having a molecular weight greater than 200 g/mol comprising a branched or unbranched alkyl residue having 10 to 30 carbon atoms; thixotroping agents F6; and stabilizers F7 (such as especially: an iron or cerium organic acid salt, for example iron or cerium octoates, a cerium oxide, a cerium hydroxide, an iron oxide, the CaO oxide and the MgO oxide).

As example of an adhesion promoter F1, mention may be made of the organosilicon compounds bearing both (1) hydrolyzable groups linked to the silicon atom and (2) organic groups substituted by radicals chosen from the group of isocyanate, epoxy, alkenyl, isocyanurate, (meth)acrylate and aminoalkyl radicals.

By way of illustration of adhesion promoters F1, mention may be made of the organosilicon compounds defined below:

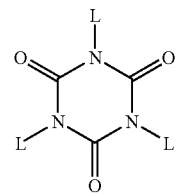

where L=—$(CH_2)_3$—$Si(OCH_3)_3$ described in U.S. Pat. No. 3,517,001;
3-glycidoxypropyltrimethoxysilane (GLYMO);
vinyltrimethoxysilane (VTMS);
methacryloxypropyltrimethoxysilane (MEMO);
3-aminopropyltrimethoxysilane;
3-aminopropyltriethoxysilane;
[3-(2-aminoethyl)aminopropyl]trimethoxysilane;
[3-(2-aminoethyl)aminopropyl]methyldimethoxysilane; and
mixtures thereof and also in an oligomerized form (resulting from condensation reaction) with other organosilicon compounds.

A single-component alkoxy type silicone sealant according to the invention cures at ambient temperature and especially at temperatures between 5 and 35° C. in the presence of moisture. The curing (or crosslinking) is carried out from the outside to the inside of the bulk of the compositions. It first forms a skin at the surface then the crosslinking continues in the bulk.

These sealants may be used for multiple applications such as jointing in the building industry, assembling and bonding the most diverse materials (metals, plastics such as for example PVC or PMMA, natural and synthetic rubbers, wood, cardboard, earthenware, brick, glass, stone, concrete or masonry components) and this being so both in the context of the building industry and in that of the automotive, domestic electrical appliance and electronics industries.

The following examples illustrate the invention without however limiting the scope thereof.

EXAMPLE 1

Comparative

Reacted in a continuous appliance having corotating mixing arms were:
- 425 parts of α,ω-dihydroxylpolydimethylsiloxane oil ("hydroxylated" oil) having a viscosity around 135 000 mPa·s;
- 164 parts of 1000 mPa·s α,ω-trimethylsilylpolydimethylsiloxane oil ("blocked" oil);
- 22 parts of vinyltrimethoxysilane type crosslinker;
- 3 parts of a 3.85% solution of hydrated lithium hydroxide (LiOH.H$_2$O functionalization catalyst) in methanol;

then successively introduced were:
- 44 parts of pyrogenic silica developing a specific surface area of 150 m$^2$/g;
- 525 parts of calcium carbonate;
- 10 parts of a catalytic preparation (curing catalyst) comprising 60% of aminosilane sold under the name Dynasilan-DS1411® by Degussa, 35% of a polyether acting as a rheology additive and 5% of a mole to mole mixture of dibutyltin dilaurate and dibutyltin acetylacetonate; and
- 25 parts of a titanium oxide-based white coloring base.

At the end of the process a vacuum was applied to evacuate the methanol present in the finished product and the sealant formed was packaged in airtight cartridges.

EXAMPLE 2

Preparation of a Masterbatch According to the Invention

Reacted in a continuous appliance having corotating mixing arms were:
- 425 parts of α,ω-dihydroxylpolydimethylsiloxane oil ("hydroxylated" oil) having a viscosity around 135 000 mPa·s;
- 164 parts of 1000 mPa·s α,ω-trimethylsilylpolydimethylsiloxane oil ("blocked" oil);
- 22 parts of vinyltrimethoxysilane type crosslinker;
- 3 parts of a 3.85% solution of hydrated lithium hydroxide (LiOH.H$_2$O) in methanol;

then successively introduced were:
- 44 parts of pyrogenic silica developing a specific surface area of 150 m$^2$/g; and
- 525 parts of calcium carbonate.

At the end of the process a vacuum was applied to evacuate the methanol present in the finished product. Thus a masterbatch was obtained packaged in pots that were sealed without being perfectly airtight.

This masterbatch was:
- either used in the days following its manufacture (Example 3);
- or placed at 50° C. for 3 weeks to simulate an aging of around 6 to 8 months at ambient temperature and used following this conditioning (Example 4);
- or placed at 50° C. for 6 weeks to simulate an aging of more than 1 year at ambient temperature and used following this conditioning (Example 5).

EXAMPLE 3

Invention 1183 parts of the masterbatch from Example 2 were placed in the bowl of a butterfly mixer with central counter-rotating scraper blades. Added under air to this masterbatch were 10 parts of the catalytic preparation and 25 parts of the colorant base from Example 1. The medium was mixed under a partial vacuum of 200 mbar until a homogeneous product was obtained (about 5 min).

The sealant formed was packaged in airtight cartridges.

EXAMPLE 4

Invention

A fraction of the masterbatch from Example 2 was conditioned at 50° C. for 3 weeks.

At the end of 3 weeks, after returning to ambient temperature, 1183 parts of this product were placed in the bowl of a butterfly mixer with central counter-rotating scraper blades.

Added under air to this masterbatch were 10 parts of a catalytic mixture and 25 parts of colorant base.

The medium was mixed under a partial vacuum of 200 mbar until a homogeneous product was obtained (about 5 min).

The sealant formed was packaged in airtight cartridges.

EXAMPLE 5

Comparative

The method from Example 1 was repeated but the colorant base was not introduced. The sealant formed was packaged for a few days in an airtight cartridge, then 1193 parts of this colorless sealant were placed in the bowl of a butterfly mixer with central counter-rotating scraper blades.

Added to this mixture in the absence of air were 25 parts of colorant base.

The medium was mixed under a partial vacuum of 200 mbar until a homogeneous product was obtained (about 5 min).

The sealant formed was packaged in airtight cartridges.

RESULTS

In Table I below, the properties of various products are compared at the start and after an accelerated aging of 3 weeks at 50° C. that enables the state of the sealant after at least 6 to 8 months storage at ambient temperature to be reproduced.

TABLE I

Results

|  | Example 1 | Example 5 | Example 3 | Example 4 | Example 2 |
|---|---|---|---|---|---|
| *Properties at the start* | | | | | |
| Extrudability (g/min) | 33 | 39 | 50 | 42 | 29 |
| Shore A hardness after 24 h | 8 | 9 | 10 | 10 | — |
| Shore A hardness after 7 days | 17 | 16 | 19 | 20 | — |
| TS (MPa) | 1 | 1.1 | 1 | 1 | — |
| EB (%) | 570 | 670 | 570 | 590 | — |
| MOD 100% (MPa) | 0.4 | 0.4 | 0.4 | 0.4 | — |
| *Properties after aging for 3 weeks at 50° C.* | | | | | |
| Extrudability (g/min) | 30 | 37 | 37 | 32 | 43 |
| Crosslinking over 2 mm after 24 h | no | no | yes | yes |  |
| Shore A hardness after 24 h | NC | NC | 9 | 9 |  |
| Shore A hardness after 7 days | 14 | 13 | 17 | 17 |  |
| TS (MPa) | 0.8 | 0.8 | 1 | 1 |  |
| EB (%) | 620 | 700 | 600 | 560 |  |
| MOD 100% (MPa) | 0.3 | 0.3 | 0.4 | 0.4 |  |

NC = not crosslinked where:
the extrudability is given by the mass of sealant extruded at 23° C. in 1 min through a 3 mm orifice under a pressure of 3 bar;
the hardness after 24 h is the hardness (in Shore A) of a stack of 3 test pieces having a thickness of 2 mm after 24 hours of crosslinking of the film. The measurements were carried out on the side of the composition having crosslinked in contact with air. The measurement was carried out by superposing 3 thicknesses of 2 mm films. The measurements were carried out according to the directions of the ASTM-D-2240 standard.
the hardness after 7 days is the hardness (in Shore A) of a stack of 3 test pieces having a thickness of 2 mm after 7 days of crosslinking of the film. The measurements were carried out on the side of the composition having crosslinked in contact with air. The measurement was carried out by superposing 3 thicknesses of 2 mm films. The measurements were carried out according to the directions of the ASTM-D-2240 standard.
mechanical properties on a film of 2 mm (TS, EB and MOD 100%): H2 type test pieces were prepared and the measurements were carried out according to the directions of the AFNOR-T-46002 standard.
The following values were taken:
tensile strength (in MPa), denoted as TS;
elongation at break (in %), denoted as EB; and
modulus at 100% elongation (in MPa), denoted as MOD 100%.

The table above demonstrates the characteristics of the invention:
1. The manufacture of the sealant according to the invention makes it possible to obtain a product having initial characteristics equivalent to that of the reference sealant.
2. After aging, the properties of the sealant according to the invention are improved relative to the reference sealant for at least 3 properties:
the cure rate: the reference sealant is not crosslinked over at least 2 mm after 24 hours whereas the sealant according to the invention is crosslinked over more than 2 mm and has a hardness that is maintained relative to the start (before accelerated aging, 3 weeks at 50° C.);
the tensile strength after crosslinking of the sealant according to the invention is unchanged relative to the start whereas it has decreased by at least 20% for the reference sealant; and
the modulus at 100% elongation has passed from 0.4 MPa to 0.3 MPa after crosslinking of the reference sealant whereas it remains unchanged at 0.4 MPa for the sealant according to the invention.

The invention claimed is:
1. A method for preparing single-component alkoxy silicone sealant, comprising:
a) preparing, in a stirred reactor, a masterbatch M that does not contain a curing catalyst H according to the steps a-1) and a-2) below:
a-1) preparing a silicone composition comprising:
i) at least one organopolysiloxane A having terminal and/or pendent alkoxylated groups;
ii) at least one mineral filler B based on amorphous silica, optionally at least one other filler selected from the group consisting of crystalline silica, calcium carbonate, a filler having a lamellar structure and combinations thereof;
iii) optionally at least one silane crosslinker C1 having alkoxylated functional groups;
iv) optionally at least one nonreactive linear diorganopolysiloxane D of formula (I):

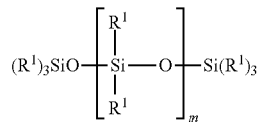

in which:
iv-1) the $R^1$ substituents, which are identical or different, each represent an aliphatic, cyclanic or aromatic, substituted or unsubstituted, saturated or unsaturated, $C_1$ to $C_{13}$ monovalent hydrocarbon-based radical; and
iv-2) m has a value to give the polymer of formula (I) a dynamic viscosity at 25° C. ranging from 10 to 200 000 mPas; and
v) optionally at least one auxiliary agent F selected from the group consisting of adhesion promoters F1, antifungal agents F2, bactericides F3, inert organic diluents F4, plasticizers F5, thixotroping agents F6, stabilizers F7 and combinations thereof; and
a-2) said silicone composition resulting from step a-1) continues to be stirred and is subjected to a devolatilization operation in order to obtain said masterbatch M;
b) preparing the single-component alkoxy silicone sealant by adding to said stirred masterbatch M:
b-1) an effective amount of a curing catalyst G alone or in the form of a preparation comprising said curing catalyst G;
b-2) optionally at least one auxiliary agent F selected from the group consisting of adhesion promoters F1, antifungal agents F2, bactericides F3, inert organic diluents F4, plasticizers F5, thixotroping agents F6, stabilizers F7 and combinations thereof;
b-3) optionally a supplement of said mineral filler B; and
b-4) optionally at least one colored pigment H alone or in the form of a preparation comprising said colored pigment H; and
c) optionally a finishing step is carried out during which the single-component alkoxy silicone sealant continues to be stirred and is subjected to a devolatilization operation carried out under a pressure below atmospheric pressure,
wherein the organopolysiloxane A having terminal and/or pendent alkoxylated groups is obtained in situ by functionalization:
of at least one reactive organopolysiloxane I comprising at least two hydroxyl groups; in the presence of a catalytically effective amount of a functionalization catalyst J; and
of at least one silane crosslinker C2 having alkoxylated functional groups, and
the functionalization catalyst J comprises at least one component selected from the group consisting of:
lithium hydroxide of formula LiOH or LiOH.H$_2$O;
sodium hydroxide; and
potassium hydroxide.

2. The method of claim 1, in which in step a-1) the proportions based on 100 parts by weight of reactive organopolysiloxane I comprising at least two hydroxyl groups are the following:
   a) from 2 to 25 parts of silane crosslinker(s) C2;
   b) a catalytically effective amount of functionalization catalyst J;
   c) from 0 to 50 parts of nonreactive, linear diorganopolysiloxane(s) D;
   d) from 2 to 150 parts of mineral filler(s) B; and
   e) from 0 to 50 parts of auxiliary agent(s) F.

3. The method of claim 1 or 2, in which the silane crosslinkers C1 and/or C2 are comprised, are identical or different, and are polyalkoxysilanes of formula (III):

$$(R^4)_a Si(OR^5)_{4-a} \tag{III}$$

in which formula:
the R$^4$ substituent represents an aliphatic, cyclanic or aromatic, substituted or unsubstituted, saturated or unsaturated, C$_1$ to C$_{13}$ monovalent hydrocarbon-based radical;
the R$^5$ symbols, which are identical or different, each represent a linear or branched C$_1$ to C$_8$ alkyl radical; and
a is 0, 1 or 2.

4. The method of claim 3, in which the silane crosslinker C2 is selected from the group consisting of:
Si(OC$_2$H$_5$)$_4$, CH$_3$Si(OCH$_3$)$_3$, CH$_3$Si(OC$_2$H$_5$)$_3$, (C$_2$H$_5$O)$_3$Si(OCH$_3$), (CH$_2$=CH)Si(OCH$_3$)$_3$, and (CH$_2$=CH)Si(OC$_2$H$_5$)$_3$.

5. A method for preparing single-component alkoxy silicone sealant, comprising:
a) preparing, in a stirred reactor, a masterbatch M that does not contain a curing catalyst H according to the steps a-1) and a-2) below:
   a-1) preparing a silicone composition comprising:
      i) at least one organopolysiloxane A having terminal and/or pendent alkoxylated groups;
      ii) at least one mineral filler B based on amorphous silica, optionally at least one other filler selected from the group consisting of crystalline silica, calcium carbonate, a filler having a lamellar structure and combinations thereof;
      iii) optionally at least one silane crosslinker C1 having alkoxylated functional groups;
      iv) optionally at least one nonreactive linear diorganopolysiloxane D of formula (I)

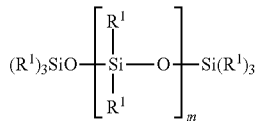

in which:
         iv-1) the R$^1$ substituents, which are identical or different, each represent an aliphatic, cyclanic or aromatic, substituted or unsubstituted, saturated or unsaturated, C$_1$ to C$_{13}$ monovalent hydrocarbon-based radical; and
         iv-2) m has a value to give the polymer of formula (I) a dynamic viscosity at 25° C. ranging from 10 to 200 000 mPas; and
      v) optionally at least one auxiliary agent F selected from the group consisting of adhesion promoters F1, antifungal agents F2, bactericides F3, inert organic diluents F4, plasticizers F5, thixotroping agents F6, stabilizers F7 and combinations thereof; and
   a-2) said silicone composition resulting from step a-1) continues to be stirred and is subjected to a devolatilization operation in order to obtain said masterbatch M;
b) preparing the single-component alkoxy silicone sealant by adding to said stirred masterbatch M:
   b-1) an effective amount of a curing catalyst G alone or in the form of a preparation comprising said curing catalyst G;
   b-2) optionally at least one auxiliary agent F selected from the group consisting of adhesion promoters F1, antifungal agents F2, bactericides F3, inert organic diluents F4, plasticizers F5, thixotroping agents F6, stabilizers F7 and combinations thereof;
   b-3) optionally a supplement of said mineral filler B; and
   b-4) optionally at least one colored pigment H alone or in the form of a preparation comprising said colored pigment H; and
c) optionally a finishing step during which the mixture obtained at the end of the preceding step continues to be stirred and is subjected to a devolatilization operation,
wherein the organopolysiloxane A having terminal and/or pendent alkoxylated groups is obtained in situ by functionalization:
of at least one reactive organopolysiloxane I comprising at least two hydroxyl groups; in the presence of a catalytically effective amount of a functionalization catalyst J; and
of at least one silane crosslinker C2 having alkoxylated functional groups, and
the functionalization catalyst J comprises at least one component selected from the group consisting of:
lithium hydroxide of formula LiOH or LiOH.H$_2$O
sodium hydroxide; and
potassium hydroxide.

6. The method of claim 1, wherein said stirred reactor has corotating mixing arms.

7. The method of claim 5, wherein said stirred reactor has corotating mixing arms.

* * * * *